March 5, 1963 M. HORNSTEINER 3,079,807
TRANSMISSION APPARATUS
Filed Feb. 23, 1960
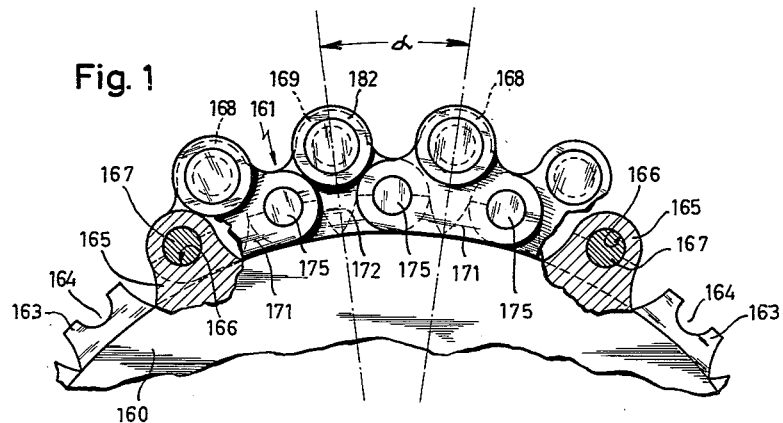
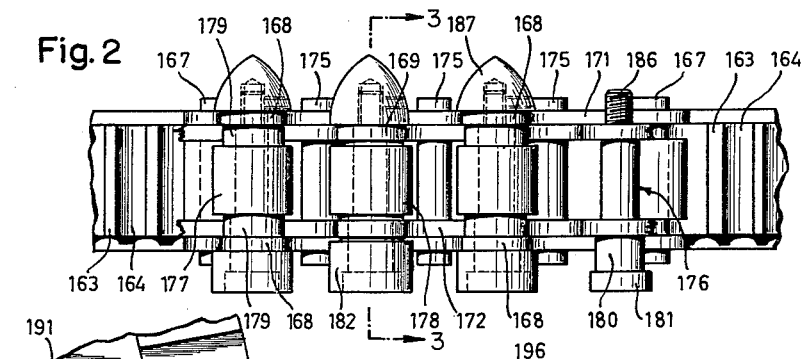
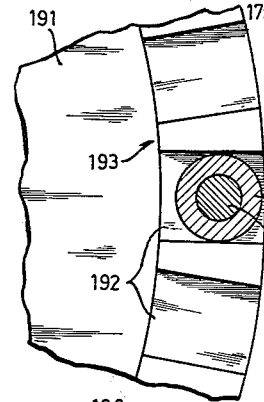
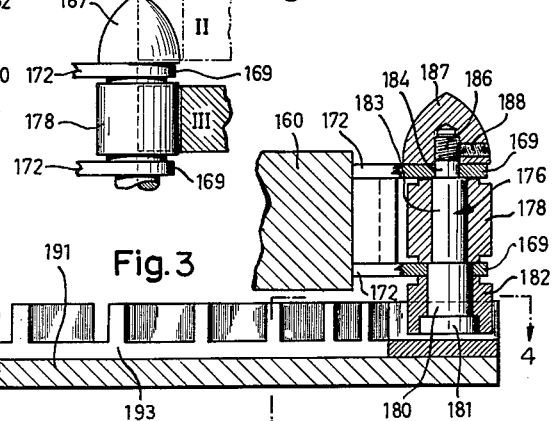
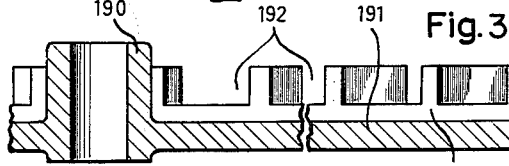
INVENTOR.
Maximilian Hornsteiner
BY
Michael S. Striker
Attorney United States Patent Office 3,079,807
Patented Mar. 5, 1963

3,079,807
TRANSMISSION APPARATUS
Maximilian Hornsteiner, Deckerstrasse 111,
Stuttgart-Bad Cannstatt, Germany
Filed Feb. 23, 1960, Ser. No. 10,257
7 Claims. (Cl. 74—415)

The present invention, a continuation-in-part of application Serial No. 708,477, filed January 13, 1958, now abandoned, relates to transmission apparatus, and more particularly to a transmission apparatus including a sprocket wheel, and a supporting wheel carrying an endless roller chain.

A particularly advantageous operation is obtained if the smaller wheel, either the roller chain wheel or the sprocket, is driven, and has a pitch angle of less than 20°, preferably 15° or less. Preferably, the smaller wheel has at least 20 rollers or cogs, and in a preferred embodiment 24 cogs or rollers are provided. In this arrangement, there is no sliding friction, but only rolling friction, between the cogs of the sprocket wheel and the endless roller chain.

It is one object of the present invention to provide a transmission apparatus in which standard roller chains can be used instead of toothed gears.

Another object of the present invention is to provide a transmission apparatus which can be inexpensively manufactured of standard parts.

Another object of the present invention is to provide a transmission apparatus in which two transmission elements are in meshing engagement, while the meshing parts do not slide on each other, but roll on each other.

Another object of the present invention is to provide a transmission apparatus for transmitting large forces.

Another object of the present invention is to provide a transmission apparatus whose elements are readily brought into engagement.

With these objects in view, the present invention mainly consists in a transmission apparatus which comprises, in combination, at least one supporting wheel, roller chain means arranged in an endless loop on the supporting wheel, and secured thereto; and at least one wheel having cogs meshing with the roller chain means.

Preferably, the roller chain means includes two circular link chains supported on the supporting wheel, and rollers freely rotatable on the link chains, and being spaced from the supporting wheel.

The endless roller chain is mounted on the supporting wheel either in a position in which the rollers correspond to the teeth of an external spur gear, or in a position in which the rollers project inwardly to have the effect of an internal gear.

The supporting wheel and the roller chain thereon may have a greater diameter than the sprocket wheel, or preferably a smaller diameter. If the supporting wheel with the roller chain has a smaller diameter than the sprocket wheel, the sprocket wheel may be constructed as an internal gear. The roller chain is attached to the supporting wheel either by at least one pin of pins which turnably support the rollers on the link chains, or additional links may be provided which project in radial direction into a recess in the supporting wheel.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary side view, partly in section, illustrating another embodiment of the present invention;

FIG. 2 is a fragmentary developed plan view of the embodiment of FIG. 1;

FIG. 3 is a fragmentary sectional view taken on line 3—3 in FIG. 2 illustrating the roller chain in meshing engagement with a wheel having lateral cogs;

FIG. 4 is a fragmentary section taken on line 4—4 in FIG. 3; and

FIG. 5 is a fragmentary view, partly in section, illustrating three operational positions of a shiftable sprocket wheel in connection with a roller chain of the type illustrated in FIGS. 1–4.

The transmission apparatus of the present invention is illustrated in FIGS. 1–5. A supporting wheel 160 only partly shown in FIG. 1 has projections 163 formed with semi-circular recesses 164 in which pins 175 are located. Preferably at an angular distance of 60°, lugs 165 are provided on the wheel 160. The lugs 165 have bores 166 receiving pins 167 for securing the roller chain 161 to the wheel 160. The pins 175, however, are capable of a slight movement in the recesses 164.

The roller chain 161 includes two link chains composed of inner links 172 and outer links 171. The outer and inner links are connected by the pins 175, and form two link chains. Each outer link 171 has a radial projection 168, and each inner link 172 has a radial projection 169. As best seen in FIG. 3, pins 176 are mounted in the projections 168 and 169. Each pin includes a head portion 181, a portion 180, a thinner portion 183, a portion 184 supported in a projection 169, or 168, and a threaded portion 186. A first set of operative rollers 177 and 178 is supported on the portions 176 of the pins. A second set of operative rollers 182 is supported for turning movement on the pin portions 180. A cap portion 187 is threaded onto the threaded portion 186 of pin 176. The diameters of the roller portions 182 and 178, as well as the greatest diameter of the cap portion 187, are greater than the radial extension of the lugs 168 and 169 so that the link chains do not interfere with the meshing of the rollers. A set screw 188 secures the cap 187 on pin 176. The roller elements 177 which are mounted in the lugs 168 of the outer links have shorter cap portions, and a connecting portion 179 corresponding to the axial extension of the inner links. On the other hand, the roller portions 182 of the roller elements 178 which are mounted on the inner links 172, 169 are longer in axial direction than the corresponding roller portions of the roller elements which are supported on the outer links 171, as best seen in FIG. 2.

The roller chain wheel illustrated in FIGS. 1, 2 and 3 advantageously cooperates with a wheel 191 which includes a hub 190, and laterally arranged cog portions 193, best seen in FIG. 4. Between the cog portions 193, radially extending recesses 192 are formed which receive the roller portions 182 as shown in FIGS. 3 and 4. A sprocket wheel is designated in FIG. 5 by the reference numeral 196. The sprocket wheel 196 meshes in the position III with the operative roller portion 178. However, in a preferred embodiment of the present invention, the sprocket wheel 196 which has cogs 197 is shiftable in axial direction from an inoperative position I to the operative meshing position III. The coupling engagement is facilitated by the tapered guiding portion 187 which slides between adjacent cogs 197 and aligns the cogs with the roller portions 178 so that sliding from the intermediate position II into the operative position III is facilitated. Since the guiding portion 187, and the roller portion 178 project beyond the links 172, the links 172 cannot interfere with the axial movement of the wheel 196.

As shown in FIG. 1, the radial projections 169 and 168, and consequently the rollers 177 and 178 are angularly spaced a pitch angle α of 15° which results in rolling of the respective rollers on the associated cogs without any sliding friction.

It will be understood that each of the elements described above, or two or more together, may also find a useful application in other types of transmission apparatus differing from the types described above.

The pitch angle α should not exceed 20° and is preferably in the order of 15° but may yet be smaller. By choosing such pitch angles the gliding and rubbing motion between the cogs of the cog wheel and the rollers of the chain are reduced to such an extent that a long life of the gearing is assured. These angles are important when the ratio of transmission differs from 1:2 where theoretically ideal conditions prevail. Especially, when the ratio of transmission exceeds 1:2 and is above 1:2.5 or even as high as 1:3, 1:4 or higher the aforementioned pitch angles should be used and in actual practice it has been found that in many cases optimal conditions regarding wear and stability are obtained when this pitch angle is about 15°.

While the invention has been illustrated and described as embodied in a transmission apparatus including a wheel carrying an endless roller chain, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention to be comprehended within the meaning and range of equivalence of the following claims.

What is claimed as new and desired to be secured by Letters Patent is:

1. A transmission apparatus comprising, in combination, a supporting wheel; roller chain means supported on and extending in a closed loop about the whole periphery of said supporting wheel, said roller chain means including two axially spaced link chains each including at least one set of links having each a radially extending projecting portion, a plurality of pins pivotally connecting the ends of adjacent links in each chain to each other, and a plurality of axially extending roller means respectively freely rotatably mounted on said projecting portions of said two link chains and having each an operative portion projecting in axial direction laterally beyond one link chain away from the other link chain; means for securing said roller chain means at least at one point to said supporting wheel; and at least one sprocket wheel having teeth adapted to mesh with said operative portions of said roller means.

2. A transmission apparatus comprising, in combination, a supporting wheel; roller chain means supported on and extending in a closed loop about the whole periphery of said supporting wheel, said roller chain means including two axially spaced link chains each including at least one set of links having each a radially extending projecting portion, a plurality of pins pivotally connecting the ends of adjacent links in each chain to each other, and a plurality of axially extending roller means respectively freely rotatably mounted on said projecting portions of said two link chains and having each an operative portion projecting in axial direction laterally beyond one link chain away from the other link chain; means for securing said roller chain means at least at one point to said supporting wheel; and at least one sprocket wheel having teeth projecting in lateral directions therefrom and meshing with said operative portions of said roller means.

3. A transmission apparatus comprising, in combination, a supporting wheel; roller chain means supported on and extending in a closed loop about the whole periphery of said supporting wheel, said roller chain means including two axially spaced link chains having each a set of outer links aligned and spaced from each other and a set of inner links having opposite ends overlapping the ends of adjacent outer links, each of said links having radially extending projecting portions, pins pivotally connecting said overlapping ends of said inner and outer links to each other, and a plurality of axially extending roller means respectively freely rotatably mounted on said projecting portions of said two link chains and having each an operative portion projecting in axial direction laterally beyond one link chain away from the other link chain; means for securing said roller chain means at least at one point to said supporting wheel; and at least one sprocket wheel having teeth adapted to mesh with said operative portions of said roller means.

4. A transmission apparatus comprising, in combination, a supporting wheel; roller chain means supported on and extending in a closed loop about the whole periphery of said supporting wheel, said roller chain means including two axially spaced link chains each including at least one set of links having each a radially extending projecting portion, a plurality of pins pivotally connecting the ends of adjacent links in each chain to each other, and a plurality of axially extending roller means respectively freely rotatably mounted on said projecting portions of said two link chains and having each an operative portion located between said link chains and a guiding portion projecting in axial direction outwardly from one of said link chains, said guiding portion having adjacent said one link chain a radius substantially equal to the radius of said operative portion and said guiding portion tapering in direction away from said one link chain; means for securing said roller chain means at least at one point to said supporting wheel; and at least one sprocket wheel having teeth adapted to mesh with said operative portions of said roller means, said sprocket wheel being movable in axial direction between an inoperative position, an intermediate position in which the teeth of said wheel slide over said guiding portions and an operative position in which said teeth mesh with said operative portions of said roller means.

5. A transmission apparatus as set forth in claim 4 wherein each of said roller means includes another operative portion projecting in axial direction from the other of said link chains; and a second sprocket wheel having teeth meshing with said other operative portions of said roller means.

6. A transmission apparatus comprising, in combination, a supporting wheel; roller chain means supported on and extending in a closed loop about the whole periphery of said supporting wheel, said roller chain means including two axially spaced link chains each including at least one set of links having each a radially extending projecting portion, a plurality of pins pivotally connecting the ends of adjacent links in each chain to each other, and a plurality of axially extending roller means respectively freely rotatably mounted on said projecting portions of said two link chains and having each an operative portion located between said link chains and a guiding portion projecting in axial direction outwardly from one of said link chains, said guiding portion having adjacent said one link chain a radius substantially equal to the radius of said operative portion and said guiding portion tapering in direction away from said one link chain, said radius being greater than the maximum extension of said projecting portion measured in radial direction from the pivot axis of the respective roller means; means for securing said roller chain means at least at one point to said supporting wheel; and at least one sprocket wheel having teeth adapted to mesh with said operative portions of said roller means, said sprocket wheel being movable in axial direction between an inoperative position, an intermediate position in which the teeth of said wheel slide over said guiding portions and an operative position in which said teeth mesh with said operative portions of said roller means.

7. A transmission apparatus comprising, in combination, a supporting wheel having a plurality of spaced radially extending projections uniformly distributed about the circumference thereof and each formed with an axially extending semi-cylindrical depression on the outer face thereof; roller chain means supported on and extending in a closed loop about the whole periphery of said supporting wheel, said roller chain means including two axially spaced link chains each including at least one set of links having each a radially extending projecting portion, a plurality of pins respectively located in said depressions and pivotally connecting the ends of adjacent links in each chain to each other, and a plurality of axially extending roller means respectively freely rotatably mounted on said projecting portions of said two link chains and having each an operative portion projecting in axial direction laterally beyond one link chain away from the other link chain; means for securing said roller chain means at least at one point to said supporting wheel; and at least one sprocket wheel having teeth adapted to mesh with said operative portions of said roller means.

References Cited in the file of this patent

UNITED STATES PATENTS

| | | |
|---|---|---|
| 614,922 | Abell | Nov. 29, 1898 |
| 628,939 | Holt | July 18, 1899 |
| 1,293,123 | Konetsky | Feb. 4, 1919 |

FOREIGN PATENTS

| | | |
|---|---|---|
| 19,608 | Great Britain | Sept. 24, 1904 |